US007080319B1

(12) United States Patent
Hernandez, III (10) Patent No.: US 7,080,319 B1
(45) Date of Patent: Jul. 18, 2006

(54) TECHNOLOGY TO TRANSLATE NON-TEXT DISPLAY GENERATION DATA REPRESENTING AN INDICATOR INTO TEXT VARIABLES

(75) Inventor: Gaspar Hernandez, III, Andover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/407,878

(22) Filed: Sep. 29, 1999

(51) Int. Cl.
*G06F 17/00* (2006.01)

(52) U.S. Cl. .................. 715/526; 715/531; 715/529

(58) Field of Classification Search ............... 715/526, 715/528, 531, 856, 859, 530, 529; 345/157, 345/856, 859, 569; 348/569
See application file for complete search history.

(56) References Cited

U.S. PATENT DOCUMENTS

| | | | |
|---|---|---|---|
| 4,814,754 A | | 3/1989 | Kawasaki et al. |
| 5,294,982 A | * | 3/1994 | Salomon et al. ............. 348/461 |
| 5,615,379 A | | 3/1997 | Wehle et al. |
| 5,737,520 A | | 4/1998 | Gronlund et al. |
| 5,790,977 A | | 8/1998 | Ezekiel et al. |
| 5,826,062 A | * | 10/1998 | Fake et al. .................... 715/513 |
| 5,930,399 A | * | 7/1999 | Kadyk et al. ................. 382/245 |
| 6,014,616 A | * | 1/2000 | Kim ................................ 704/8 |
| 6,160,555 A | * | 12/2000 | Kang et al. ................... 345/860 |
| 6,272,549 B1 | * | 8/2001 | Daniel ........................... 709/246 |
| 6,505,256 B1 | * | 1/2003 | York ............................... 709/246 |
| 6,545,690 B1 | * | 4/2003 | Hernandez, III ............. 345/762 |

FOREIGN PATENT DOCUMENTS

GB     2 309 804 A     8/1997

OTHER PUBLICATIONS

Smith et al., "Digital Data Over Video Channels: Techniques for Spacelab", Apr. 1993, IEEE AES Systems Magazine, pp. 16-24.*
European Search Report dated Jun. 6, 2005, for EP Application No. 000308082.

* cited by examiner

*Primary Examiner*—Sanjiv Shah (57) ABSTRACT

The invention is for use with a system having an interface that features plural indicators on a video screen energized according to a file of non-text display-generation data, where each indicator represents information about a parameter of a large system, such as a wireless telephony system. The invention provides technology for automatically translating a subset of the file of non-text display-generation data into text variables having values that represent characteristics of a desired one of the indicators. The technology (1) acquires a file of non-text display-generation data, (2) extracts groups of data, representative of the plurality of indicators, respectively, from the file of non-text display-generation data or a file that corresponds to it, (3) identifies one of the groups of data as corresponding to the desired indicator, and (4) converts the identified group of data into a set of text variables having values representative of the characteristics of the desired indicator. The technology also translates the non-text data into groups of text data either before the aspect of extracting, identifying or converting.

49 Claims, 8 Drawing Sheets

TECHNOLOGY TO TRANSLATE NON-TEXT DISPLAY GENERATION DATA REPRESENTING AN INDICATOR INTO TEXT VARIABLES

FIELD OF THE INVENTION

The invention is directed toward a technology for translating non-text data into text variables, and more particularly for translating a subset of a file of non-text display generation data into text variables representing an indicator that would be featured on a video screen energized according to the non-text display generation data.

BACKGROUND OF THE INVENTION

Large systems often include monitoring subsystems that permit one or more operators to monitor the performance of the system in general, and to specifically monitor the state of one or more parameters of the large system. In some instances, the manner in which the monitoring subsystem delivers information to the operator can become problematic.

An example of such a monitoring subsystem is the AUTOPLEX® Maintenance CRT (MCRT) monitoring system marketed by Lucent Technologies Inc. as a tool for use with its various wireless telephony systems. The AUTOPLEX® MCRT monitoring system includes a user interface by which an operator can input a request for information concerning a parameter of the wireless telephony system. In response, the AUTOPLEX® MCRT monitoring system displays the desired information on a video screen. As the capabilities of the AUTOPLEX® MCRT monitoring system have grown, so has the amount of information that it can display per screen.

A typical display screen partitions the viewing area into regions that have a predefined association with a parameter. The combination of attributes of a region is understood to be an indicator of the characteristics of the parameter. Typical indicator attributes might include an alphanumeric string representing a value, one of two foreground and background color combinations, whether it is blinking or not blinking, and/or whether it is not visible at all. Such a video screen is energized according to a file of non-text, i.e., hexadecimal code, display generation data. A system such as the AUTOPLEX® MCRT monitoring system can be described as a dedicated non-text-variable-output system.

To derive meaning from such a video screen, an operator must be familiar with the predefined associations. Otherwise, the video screen appears merely to be an array of variously-colored alphanumeric strings, some of which might be blinking.

Once an operator is familiar with such a video screen, he can submit (among other things) a Status Display Page (SDP) command to the interface to request information about a particular parameter or large system configuration. Then, the operator watches the screen until the requested array of information is displayed. Using his knowledge of the predefined associations for the requested screen, the operator looks to the region that acts as an indicator for the parameter. In that region, the operator observes the alphanumeric string, the combinations of colors and whether or not the combination is blinking, or whether the region is totally blank. In his mind, the operator translates the attributes of the indicator into the characteristics of the indicator. Usually, the characteristics of the indicator are the alphanumeric string and the state, the state being represented by the combination of colors.

It is burdensome to the operator to have to perform this translation. Plus, it is prone to error if the operator has less than perfect recall of the predefined associations and/or attribute/characteristic relationships. A typical screen for the SDP command has about 20–30 indicators and there are over 100 screens that can be requested with the SDP command. In addition, the color relationships for an indicator on an SDP screen can change from one software release of the AUTOPLEX® MCRT monitoring system to the next. Thus, there is a great deal of information that an operator must remember about all of the SDP commands.

Sometimes, an operator will change a parameter in the system. There might be a delay between when the operator requests the change and when it takes effect. An operator can confirm that the change has taken effect by monitoring an indicator on an SDP screen. If there is a delay in the change taking effect, then the operator must watch the video screen until the attributes of the corresponding indicator change. Until that change takes effect, the operator is held captive by the video screen.

Suppose a parameter is critical to the operation of a component of the wireless telephony system. An operator might be assigned to verify that parameter's state is always acceptable. In theory, this requires the operator to never avert his eyes from the screen. If the appearance of the indicator changes, the operator must recognize the change in appearance and respond accordingly. Again, the operator is held captive by the video screen.

It is desired to free the operator of the AUTOPLEX® MCRT monitoring system from the captivity represented by not being able to avert his eyes from the video screen generated in response to the SDP command, as well as to liberate operators of other similar dedicated non-text-variable-output systems. One way to do this is to rewrite the software for the system so that the characteristics of the parameters are provided in the form of text variables which can be displayed and manipulated, and not merely in the form of a file of non-text (hexadecimal code) display generation data. However, such large systems are typically mature products for which research and development efforts have been greatly diminished. This makes such a rewrite prohibitively expensive to undertake.

SUMMARY OF THE INVENTION

The invention provides a technology for translating a subset of a file of non-text display generation data into text variables. For example, these text variables represent an indicator that would be featured on a video screen energized according to the non-text display generation data. The technology includes a method, a device that implements the method, and a computer readable medium bearing a program which causes a computer to implement the method.

The invention is, in part, a recognition, that it is possible to translate the attributes of an indicator in a dedicated non-text-variable-output systems into text variables that represent the attributes of the indicator without rewriting the software of the dedicated non-text-variable-output systems. Rather, the file of non-text display generation data that is used to energize a video screen (with indicators) can be captured and transformed into text variables representing attributes of a desired one of the indicators, i.e., the characteristics of a corresponding desired parameter. In this way, the invention does not disturb the existing monitoring system and yet achieves the desired goal.

The technology according to the invention is operable to: acquire a file of non-text display-generation data; extract groups of data, representative of the plurality of indicators, respectively, from either the file of non-text display-generation data or a file corresponding to it; identify one of the groups of data as corresponding to the desired indicator; and convert the identified group of data into a set of text variables having values representative of the characteristics of the desired indicator. The technology also translates the non-text data into groups of text data either before the aspect of extracting, identifying or converting. This translation explains why the aspect of extracting operates on either the file of non-text display-generation data or a file corresponding to it.

Objectives, features and advantages of the invention will be more fully apparent from the following detailed description of the preferred embodiments, the appended claims and the accompanying drawings.

BRIEF DESCRIPTION OF THE DRAWINGS

The accompanying drawings are intended to depict example embodiments of the invention and should not be interpreted to limit the scope thereof.

FIGS. 1A–1D depict a flowchart representing the method according to the invention.

FIG. 2 depicts in more detail an aspect of the method of FIG. 1A.

FIG. 3 depicts the system in which the device according to the invention forms a part.

FIG. 4 is a Unified Modeling Diagram of an example use of the invention.

FIG. 5 is a state diagram that extends the example represented by FIG. 4.

DETAILED DESCRIPTION OF THE PREFERRED EMBODIMENTS

FIGS. 1A–1D and 2 depict flowcharts representing the method according to the invention. This method is embodied by the device according to the invention, which is depicted as part of the overall system of FIG. 3. To establish the context for FIGS. 1A–1D and 2, FIG. 3 will be discussed first.

Figure 3:
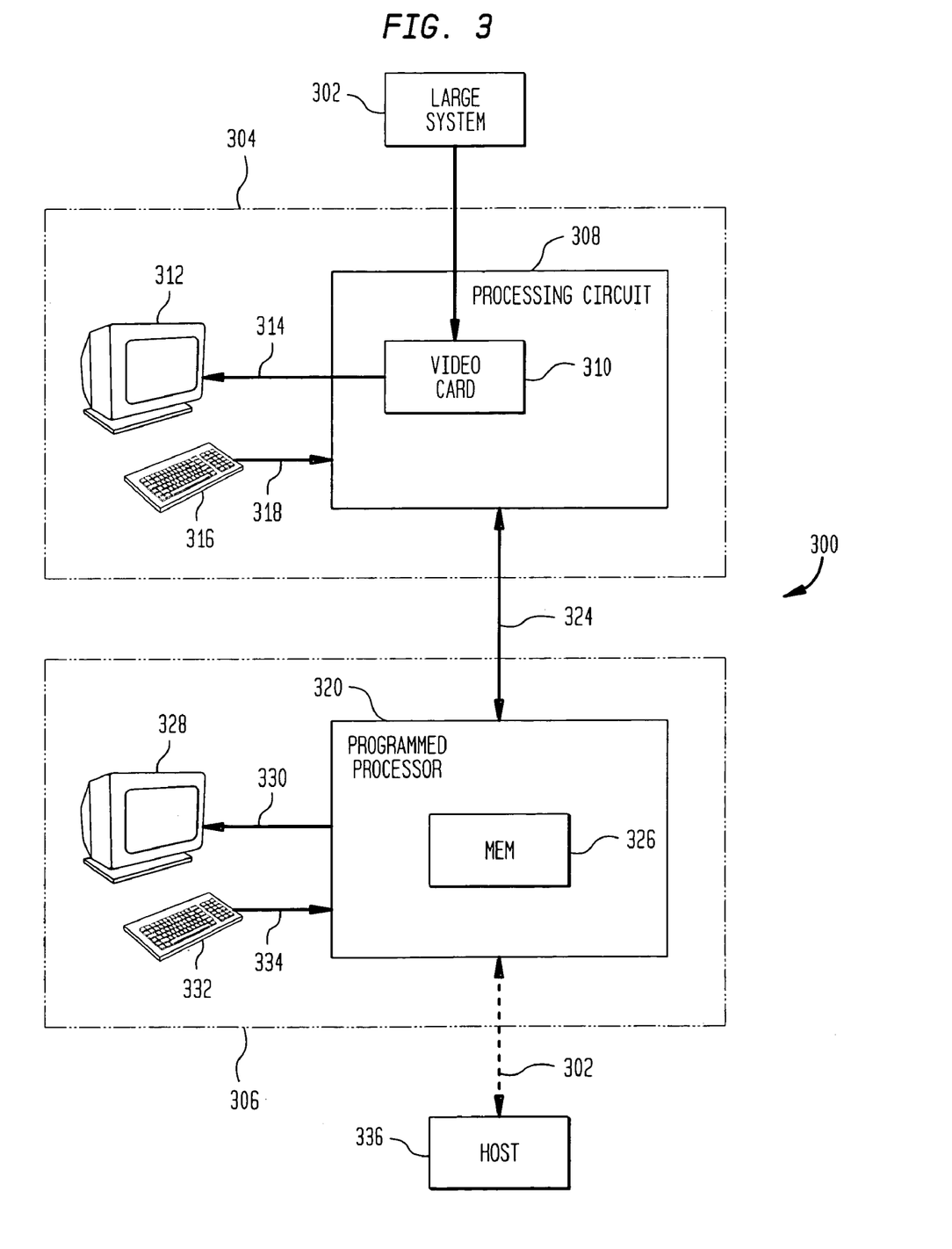

FIG. 3 depicts an overall system 300 of which the device 306 according to the invention forms a part. The other parts of the overall system 300 are the large system 302 and the monitoring system 304, examples of each of which were discussed above in the Background Section. Again, an example of the large system 302 is a wireless telephony system and an example of the monitoring system 304 is the AUTOPLEX® MCRT monitoring system marketed by Lucent Technologies Inc.

The monitoring system 304 includes processing circuitry 308, a part of which is a video display driver circuit card 310. The term "video display driver circuit card" is alternately referred to as a "graphics adapter," "graphics card," "v card," "video adapter," "video card," "display adapter," "video board," etc., but hereafter will be referred to as "video card." Of course, the processing circuitry 308 can be implemented in a variety of ways. As such, for example, the video card 310 can be a discrete circuit card separate from the motherboard, or can be one or more integrated circuits provided on the motherboard, etc. The video card 310 drives a video display device (VDD) 312 with non-text, typically hexadecimal code, display-generation data supplied over a connection 314. An input device in the form of a keyboard 316 is connected to the processing circuitry 308 via a signal line 318.

The device 306 according to the invention includes a processor 320, an output device in the form of a video display device (VDD) 328 connected via a signal line 330, and an input device preferably in the form of a keyboard 332 connected via a signal line 334. The programmed processor has a memory 326 for storing a program or script that causes the processor 320 to implement the method according to the invention. The processor 320 can communicate with, e.g., an input/output (I/O) port (in the case of the AUTOPLEX® MCRT monitoring system) of the processing circuitry 308 via a bidirectional link 324.

An embodiment of the invention, for example, has been written using two languages, the Tool Command Language (TCL) and C. Only about 10% of the programming is in C to take advantage of the hexadecimal and bits translation capability of C.

The computer-readable memory 326 can include RAM, ROM, a fixed hard disk drive, and/or a removable storage medium for a non-fixed disk drive such as a floppy disk or a CDROM. The program which causes the processor 320 to implement the method according to the invention can be downloaded to the processor 320 from the remote host 336 over the optional connection 338. As the program is downloaded through the optional connection 338, the computer-readable medium in which the program is embodied takes the form of a propagated signal.

As can be appreciated from the description of the FIGS. 1A–1D and 2 below, the method according to the invention performs many sorting and comparison operations as well as accesses to look-up tables (LUTs). As such, the processor 320 should be of sufficient processing power to assure reasonably quick results. Examples of adequate processors are those from the Pentium family of processors marketed by Intel Inc.

The method according to the invention will now be discussed in terms of the flowcharts in FIGS. 1A–1D and 2. Again, when an operator wishes to gather information about a parameter of the large system 302, he uses the monitoring system 304. In particular for the AUTOPLEX® MCRT monitoring system, an operator will use the Status Display Page (SDP) command to gather information. To submit such a command to the monitoring system 304, an operator must first cause an input screen to be displayed on the VDD 312. The input screen has two cursor positions, one for inputting an SDP command, and one for another command. It is necessary to assure that the cursor is in the position allotted to an SDP command. Usually, this is done by an operator looking at the location of the cursor on the input screen and evaluating in his mind whether the cursor's position is correct. If the cursor is out of position, then the operator toggles it to the correct position.

Figure 1A:
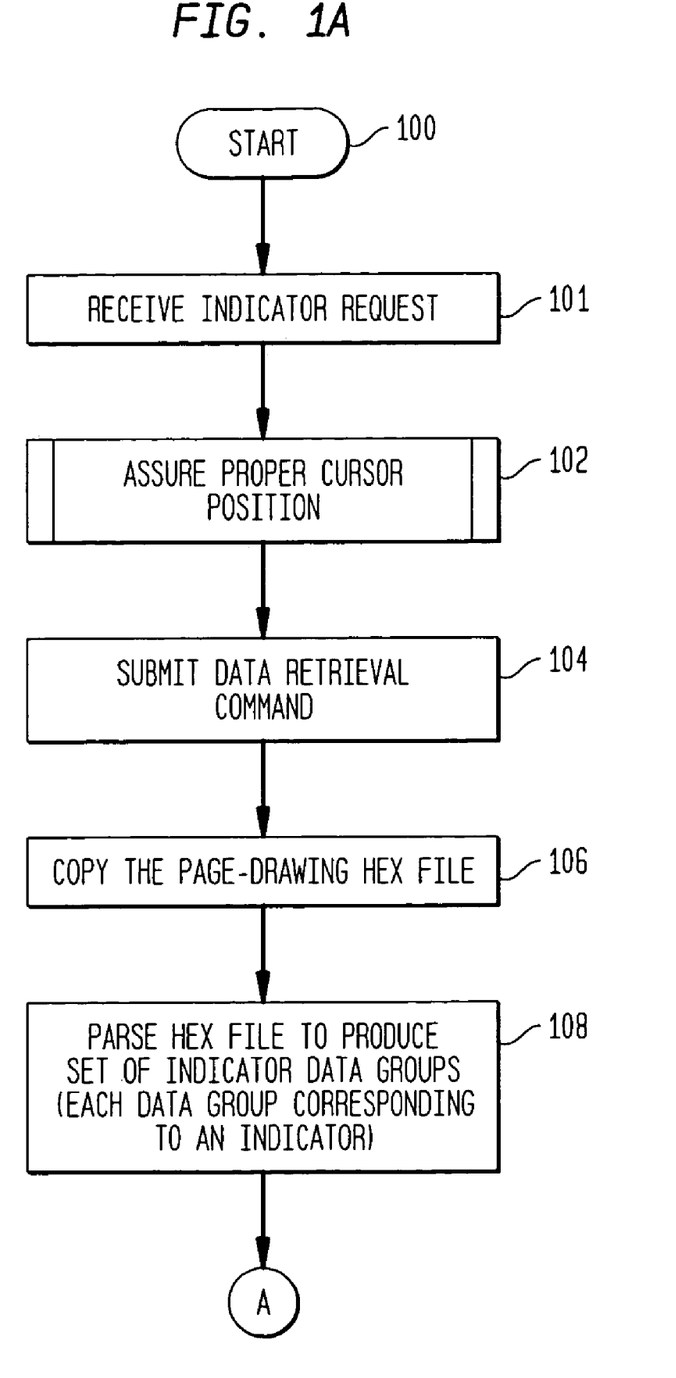
Figure 1B:
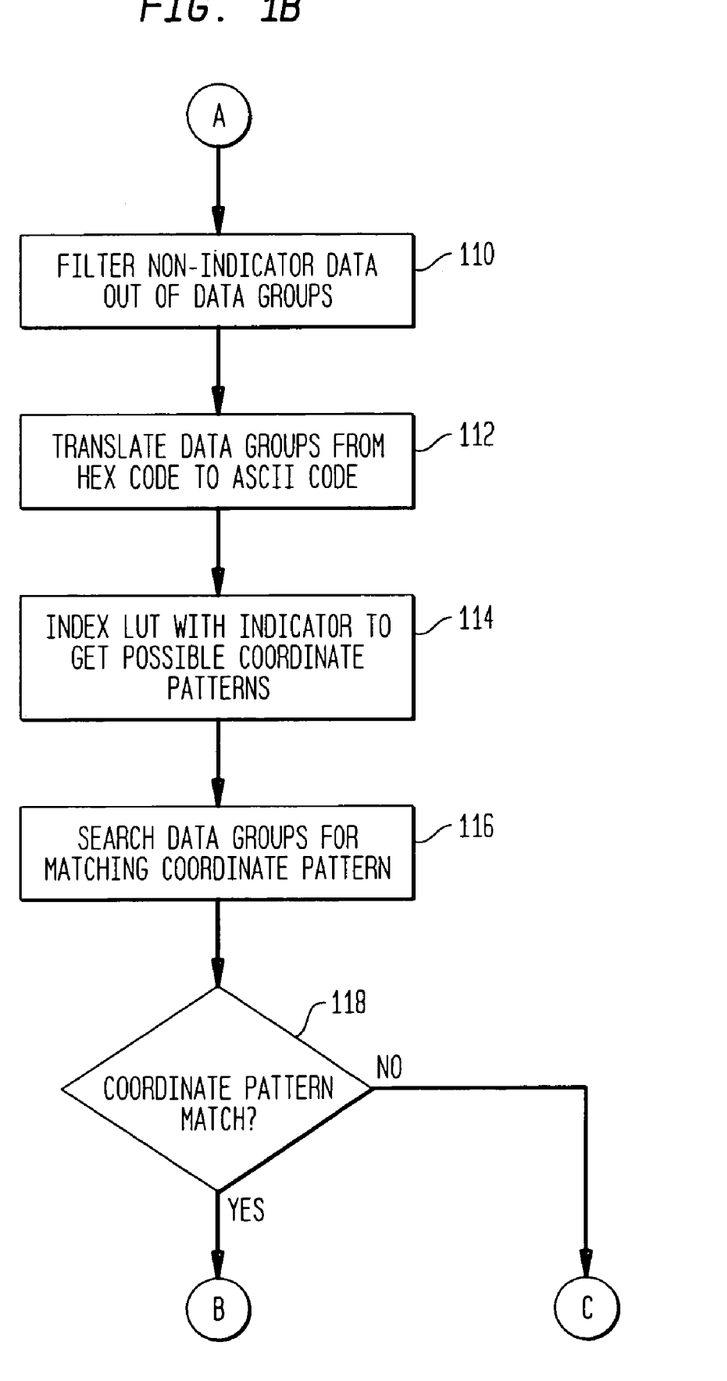

In FIG. 1A, flow starts at step 100 and proceeds to step 101, where the processor 320 receives a request for information about a desired parameter of the large system 302 from the keyboard 332 or from an automated script or calling program. Flow proceeds to steps 102–106, where a file of non-text, e.g., hexadecimal code in the case of the AUTOPLEX® MCRT monitoring system, display-generation data including the desired indicator (corresponding to the desired parameter) of the large system 302 is acquired from the monitoring system 304.

In step 102, the proper position of the cursor on the VDD 312 is automatically assured. This automatic procedure will be discussed in more detail below in terms of FIG. 2. Once the correct cursor position is assured, flow proceeds to step 104.

In step 104, the SDP command for the desired parameter is submitted to the processing circuitry 308 of the monitoring system 304 by the processor 320 via the link 324. An example SDP command is: 2138,60. The first number, 2138, represents the page number allotted to the particular arrangement of indicators that is desired to be retrieved. The second number, 60, represents the number allotted to the cell in a wireless system corresponding to item 302 in FIG. 3.

In response to the submitted SDP command, the processing circuitry 308 provides a file of non-text, i.e., hexadecimal codes, display-generation data over the connection 314 by which the VDD 312 is energized. In step 106, via the connection 324, the processor 320 acquires a copy of the file of hexadecimal code and stores it temporarily. Next, flow proceeds to steps 108–110, where groups of the hexadecimal data representing the indicators on a screen are extracted from the file of hexadecimal display-generation data.

In step 108, the processor 320 parses the file of hexadecimal codes to produce a set of Indicator Data Groups. Each such group corresponds to an indicator that would be featured on the requested SDP screen and displayed on the VDD energized according to the file of hexadecimal code display-generation data.

The file of hexadecimal code display generation data includes strings of data corresponding to attributes of the indicators that would be featured on the energized video screen. These strings are denoted at the beginning by a preset datum and/or at the end by another preset datum. For the SDP command of the AUTOPLEX® MCRT monitoring system, the strings are each preceded by the hexadecimal code representing the characters "^[".

An example of such a file of hexadecimal codes follows:
^[[00$x_1$;00$y_1$H^[[(B^[[42m^[[31m8^[[$x_2$;$y_2$Hact^[[00$x_3$; 00$y_3$H^[[(B^[[42m^[[31m8 . . .

The characters $x_i$ and $y_i$ are variables for the coordinate values in the x and y directions.

The processor 320 parses, or sequentially sifts through, the file of hexadecimal codes to find the individual data strings. The parsed file is preferably stored, e.g., as an array or file in the RAM of the processor 320. If the parsed file is to be stored as a file having multiple lines, then the characters "^[" are found and stripped from the file, and then a new line is started. Continuing with the example, this produces the following file:

[00$x_1$;00$y_1$H
[(B
[42m
[31m8
[$x_2$;$y_2$Hact
[00$x_3$;00$y_3$H
[(B
[42m
[31m8
. . .

. . .

Preferably, to ensure that the file of hexadecimal codes is valid data, the processor also searches the file to verify at least one instance of the code for the character ";" followed by the code for the character "H". As will be discussed below, these two characters are indicative of a coordinates pattern. Also, the processor 320 verifies that the parsed file has at least, e.g., 50 lines or data strings. If either of these aspects cannot be verified, then the processor considers the file of hexadecimal codes to be either corrupted or there to have been an unsuccessful page capture. The processor 320 will then resubmit the data retrieval command of step 104. After a third unsuccessful submission of the same data retrieval command, the processor 320 will terminate the algorithm and return an error notification to the user.

Each data string produced by the parsing step 108 has color combination information, text information and screen coordinate position information. However, the strings can also have additional information (not depicted in the example discussed above). Accordingly, flow proceeds to step 110 of FIG. 11B, where the processor 320 filters data that is not an attribute of an indicator out of the data strings. Such data to be filtered out include a linefeed datum, a carriage return datum and a null datum, plus any unnecessary (e.g., leading and trailing) whitespace characters. Flow proceeds from step 110 to step 112.

In step 112, the processor 320 translates the data groups (strings) from hexadecimal code to text data, preferably ASCII code. Next, in steps 114–118, the processor 320 identifies the group of data that corresponds to the desired indicator.

Flow proceeds from step 112 to step 114, where the processor 320 retrieves traits of the desired indicator that will be used to identify the corresponding data group. Again, the traits for an SDP screen indicator of the AUTOPLEX® MCRT monitoring system are coordinates, alphanumeric string and color combination (background color, foreground color, blinking or not, etc.). For output from an SDP command, the preferred trait is the screen coordinate position of the desired indicator. From one release/revision of the monitoring system 304 to another, the screen coordinate position (and the format of the coordinate representation, e.g., "[" as a prefix and "H" as a suffix, see the discussion below) of an indicator in a particular arrangement of indicators on a screen might change. To account for the possibility of multiple releases/revisions of the monitoring system, a list of all possible screen coordinate positions for each indicator in each arrangement of indicators is maintained by the processor 320. In step 114, the traits are retrieved by reading the list of possible coordinate positions for desired indicator relative to the desired screen, preferably by accessing an LUT (not shown) in the memory 326.

An example of the list (or record) in the LUT (not shown) that holds the traits of the desired indicator would be: BBA8 [00x;0yH [x;yH. Here, the numeral 8 identifies the desired indicator and the combinations 00x;0yH and x;y represent two possible screen coordinate combinations (or patterns). Here, the list/record reflects there having been two releases/revisions that have affected the coordinate information of the desired indicator. For this example, it is noted that the character, [, denotes the beginning of a coordinate attribute, while the character, H, indicates the end of a group.

It is to be recalled that the processor 320 translates from hexadecimal code to ASCII code at step 112. By translating to ASCII at that point, a user can comprehend the parsed file. If left as hexadecimal codes, the file would be almost unintelligible to a user. As new revisions to the AUTOPLEX® MCRT monitoring system are released, a user can inspect the saved ASCII version of the parsed file to determine if coordinate patterns have changed. If so, then the newly discovered patterns can be added to the corresponding LUT.

In step 116, the processor 320 searches the parsed file for possible coordinate combinations/pattern retrieved in step 114. At step 118, it is determined whether step 116 has found a match. If not, flow proceeds to step 138 of FIG. 1D, to be discussed below. If a match is found, flow proceeds to steps 120 through 136, where the group of text data (identified as corresponding to the desired indicator) is converted into a set of text variables having values that are representative of the characteristics of the desired indicator.

Continuing with the example discussed above, an identified data group or set of data strings corresponding to an indicator would be:

```
[00x₁;00y₁H
[(B
[42m
[31m8
```

The processor 320 finds the pattern [00x₁;00y₁H in the parsed file. The data strings associated with this pattern correspond to the following data groups up to, but not including, the next coordinates pattern. To identify the next coordinates, the processor 320 searches sequentially for the next occurrence of the character ";" followed by the character "H". As of now, the patterns indicative of coordinates have in common the characters ";" and "H". As new patterns arise that do not share this characteristic, the search criteria of the processor can be modified.

The identified data group in this example takes the form:

```
[00x₁;00y₁H
[(B
[colordata1
[colordata2alphumeric
```

Here, colordata1=42m, colordata2=31m and alphanumeric=8. It is noted that the data string "[(B" indicates the start of the indicator attribute information.

Figure 1C:
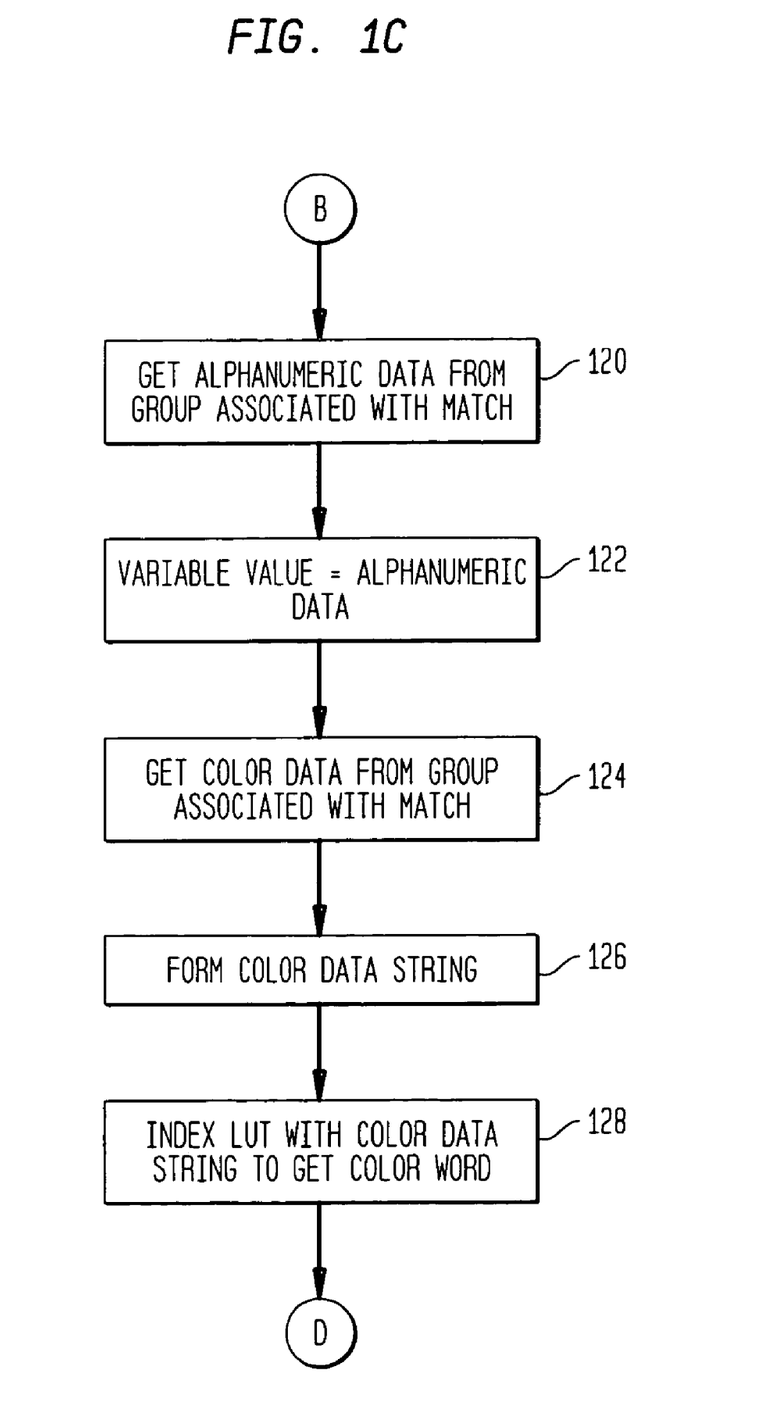
Figure 1D:
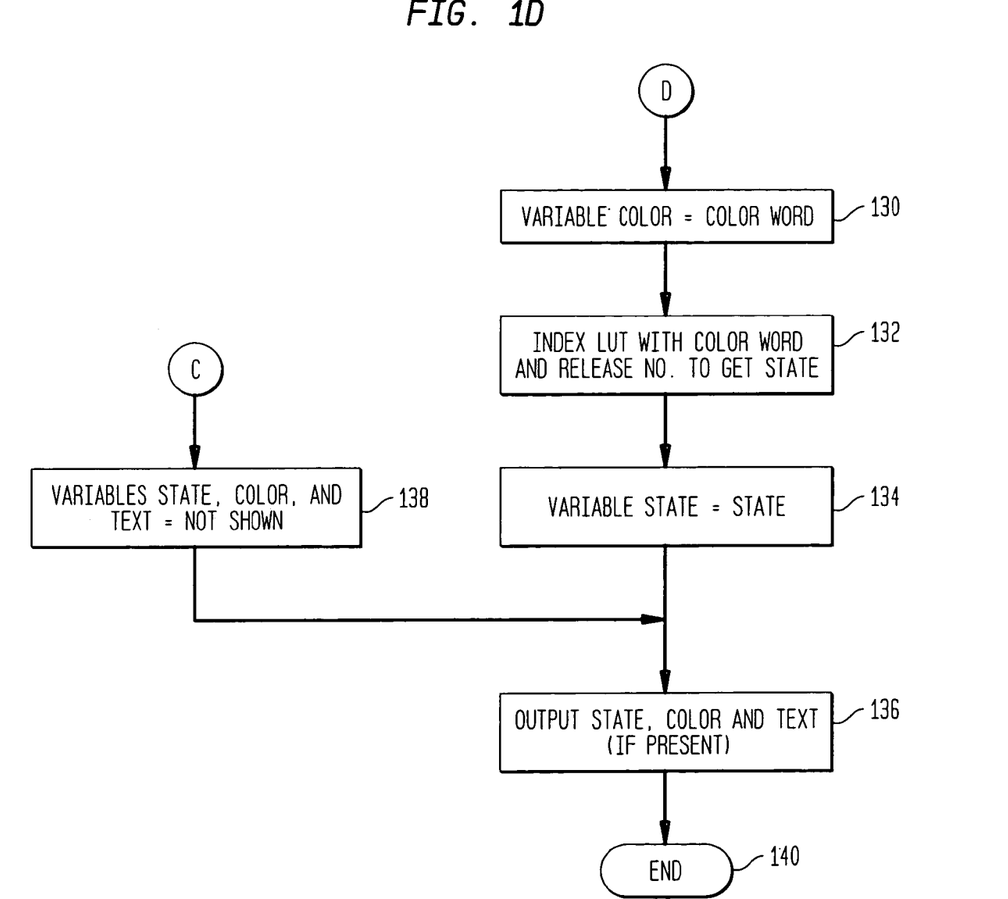

In step 120 of FIG. 1C, the processor 320 recognizes the alphanumeric string in the identified group. In step 122, the text variable VALUE is set to be equal to the alphanumeric string from step 120.

In step 124, the processor 120 recognizes the color data in the identified group. Color data terminates with the character "m" and, like the other data strings, starts with the character "[". Typically, as in the example above, there will be color data representing a combination of background color and foreground color, and there might also be data that causes the indicator to blink. Also, when alphanumeric data follows the color data, i.e., when alphanumeric data occurs after the character "m" on a line, this indicates the end of the color data as well as denoting the information relating to the value or state of the variable.

Sometimes, a coordinate pattern is immediately followed by an alphanumeric character without intervening color information. In that situation, the color data is the same as for the preceding attribute data group. Continuing with the example,

```
[00x₁;00y₁H
[(B
[42m
[31m8
[x₂;y₂Hact
``` the line or string "[x₂;y₂Hact" represents a coordinate pattern that is immediately followed by an alphanumeric character without intervening color information. Here the alphanumeric is "act", which represents the active state. The color data for the line "[x₂;y₂Hact" is the previous indicator's color data. As noted above, the start of attribute data is denoted by the characters "[(B". To find the previous indicator's color data, the processor sequentially searches backward from the line "[x₂;y₂Hact" to the line "[(B". Searching forward from the line "[(B", the processor identifies the color data as described above.

In step 126, the processor concatenates the color data to form a color data string, e.g., [colordata1 [colordata2 [colordata3.

In step 128, the processor 320 retrieves an alphanumeric color word that is descriptive of the color data string, preferably by accessing an LUT (not depicted) in the memory 326 or a separate text file. An example of the alphanumeric color word corresponding to the color data string is BLACK_ON_GREEN. In step 130 of FIG. 1D, the text variable COLOR is set to the text color word.

In step 132, the processor 320 uses the alphanumeric color word to retrieve an alphanumeric string that is descriptive of the state of the parameter that corresponds to the alphanumeric color word (again, made particular to the software release of the monitoring system 304). Preferably, retrieval is performed by accessing an LUT (not depicted) in the memory 326. In step 134, the processor 320 sets the text variable STATE to be equal to the state-descriptive alphanumeric string. Steps 132 and 134 are optional, albeit preferred, because they can be eliminated where the only operators will be more experienced operators. A more experienced operator will remember the state of the parameter that is represented by the alphanumeric color word. However, many users are not so experienced and need help to remember the state represented by a color word. It is the less experienced user that is most benefited by the steps 132 and 134.

Step 136 follows step 134. In step 136, the processor 320 outputs the values of the text variables STATE, COLOR and TEXT, e.g., by displaying this information on the VDD 328. Continuing with the example started above, such an output would look like:

Page 2138, Indicator BBA 8, Query Results
    ACT BLACK_ON_GREEN 8

The alphanumeric string, ACT, is an abbreviation of the term, active, used to describe the state of the indicator, BBA 8 (which is representative of a group of circuit boards in a cell of the wireless telephony system), and the alphanumeric 8 is the value of the indicator.

Step 138, it is to be recalled, is reached when it is determined at step 118 that no match for the indicator trait(s) has/have been found. At step 138, the processor 320 sets the text variables STATE, COLOR and TEXT to the alphanumeric string, Not Shown. In the interface which is accessed by the SDP command, it is a valid condition for a indicator not to be displayed in the location where it is expected.

Figure 2:
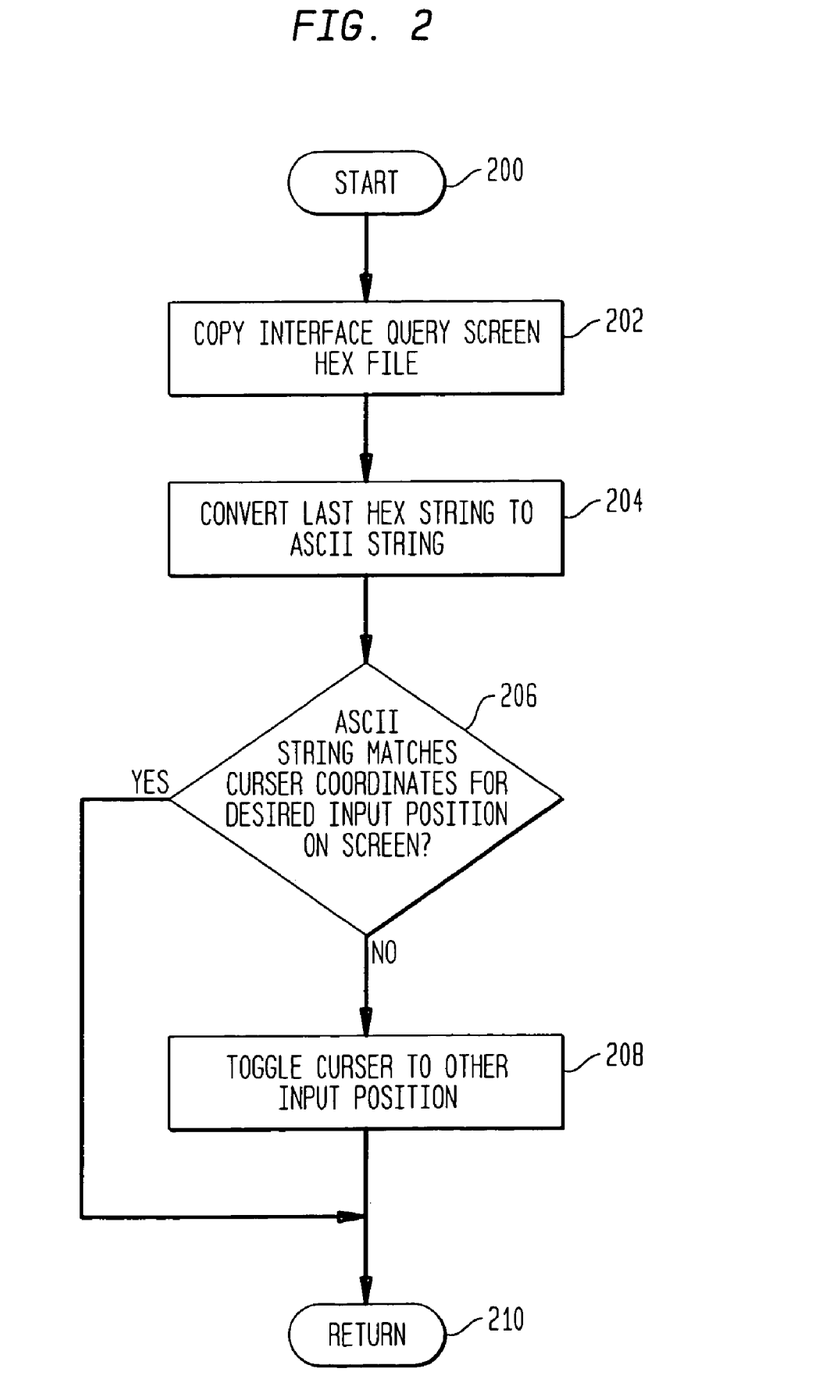

FIG. 2 depicts the procedure performed by the processor 320 to ensure that the cursor is in the proper position on the VDD 312. Flow starts at step 200 and proceeds to step 202, where the processor 320 obtains (via the link 324) a copy of the file of non-text display-generation data corresponding to the input screen for the interface which is accessed by the SDP command. It is to be recalled that the input screen has two cursor positions, one for inputting an SDP command, and one for one or more other commands.

In step 204, the processor 320 converts the last hexadecimal string in the file of non-text display-generation data into text, here ASCII, code. At step 206, it is determined whether this string of ASCII code matches the coordinate combination/pattern for the cursor position required by the SDP command. If so, flow proceeds to step 210 and from there returns to step 102 of FIG. 1A. If the ASCII does not match, then flow proceeds to step 208.

At step 208, the processor 320 submits a command (via the link 324) to the processing circuitry 308 which causes the cursor to be toggled from the other of its two positions to its desired position. Flow proceeds from step 208 to step 210, and from there returns to step 102 of FIG. 1A.

Figure 4:
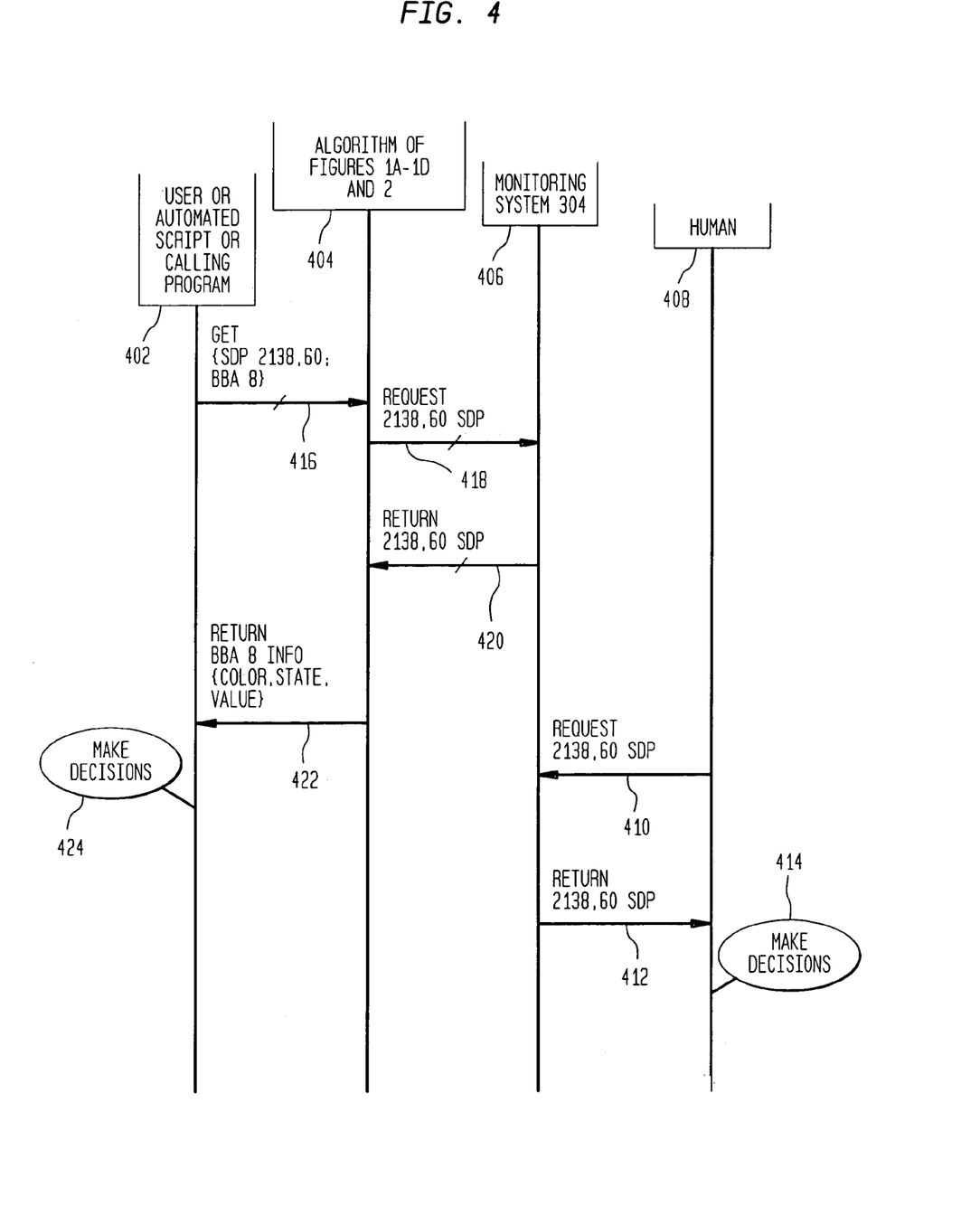

FIG. 4 is a Unified Modeling Diagram 400, also known as an Action Diagram or an Association Diagram, corresponding to the previous example in which an embodiment of the invention was applied to the AUTOPLEX® MCRT monitoring system and a wireless telephony system. Item 406 denotes actions taken by the monitoring system 304. Item 408 denotes actions taken by a human using the monitoring system 304 in the conventional manner. Item 404 denotes the actions of the implemented algorithm of FIGS. 1A–1D, and preferably FIG. 2. Item 402 denotes the actions that are taken by a human user of the invention, or an automated script or calling program interacting with the program according to the invention.

Conventionally, a human user wishing to get information about the BBA 8 of the Cell 60 must request information from the monitoring system 304, as denoted by item 410. At item 410, the human user inputs a request for a screen arranged as SDP No. 2138 having information particular to Cell No. 60. In step 412, the monitoring system 304 returns a screen of information arranged as SDP No. 2138, with information particular to Cell No. 60. The human user must recognize and interpret the indicators, i.e., the mix of alphanumerics and color combinations, on the VDD 312. Subsequently, the human user makes decisions, i.e., item 414, based upon this information. In the meantime, the human user has been held captive while waiting for the desired SDP indicator to be displayed. Plus, the human user is vulnerable to his ability to recognize and interpret the indicators on the VDD 312.

According to the invention, a human user, or an automated script or calling program, interacts with the program in the memory 326 being executed by the processor 320. At item 416, the human, script or calling program submits a request to get information on BBA 8 by way of a screen arranged as SDP No. 2138 having information particular to Cell No. 60. At item 418, the responsive action according to the invention is to automatically submit a request for a screen arranged as SDP No. 2138 having information particular to Cell No. 60. Item 418 is similar to item 410, except that it is automatically generated.

At item 420, the monitoring system 304 returns a screen of information arranged as SDP No. 2138, with information particular to Cell No. 60, in the same way as in step 412. At item 422, the responsive action according to the invention is to automatically recognized and interpret the indicators in order to return the values for the text variables COLOR, STATE and VALUE that correspond to the indicator BBA 8. Subsequently, at item 424, the human, script or calling program makes decisions.

If the actor 402 is human, items 416, 418, 420 and 422 represent how the invention frees him from the captivity represented by item 412. If the actor 402 is the script or calling program, the subsequent decision-making is only possible because of the translation of non-text display generation data (representing an indicator featured on a screen energized according to the non-text display generation data) into text variables according to the invention as represented by items 416, 418, 420 and 422.

Figure 5:
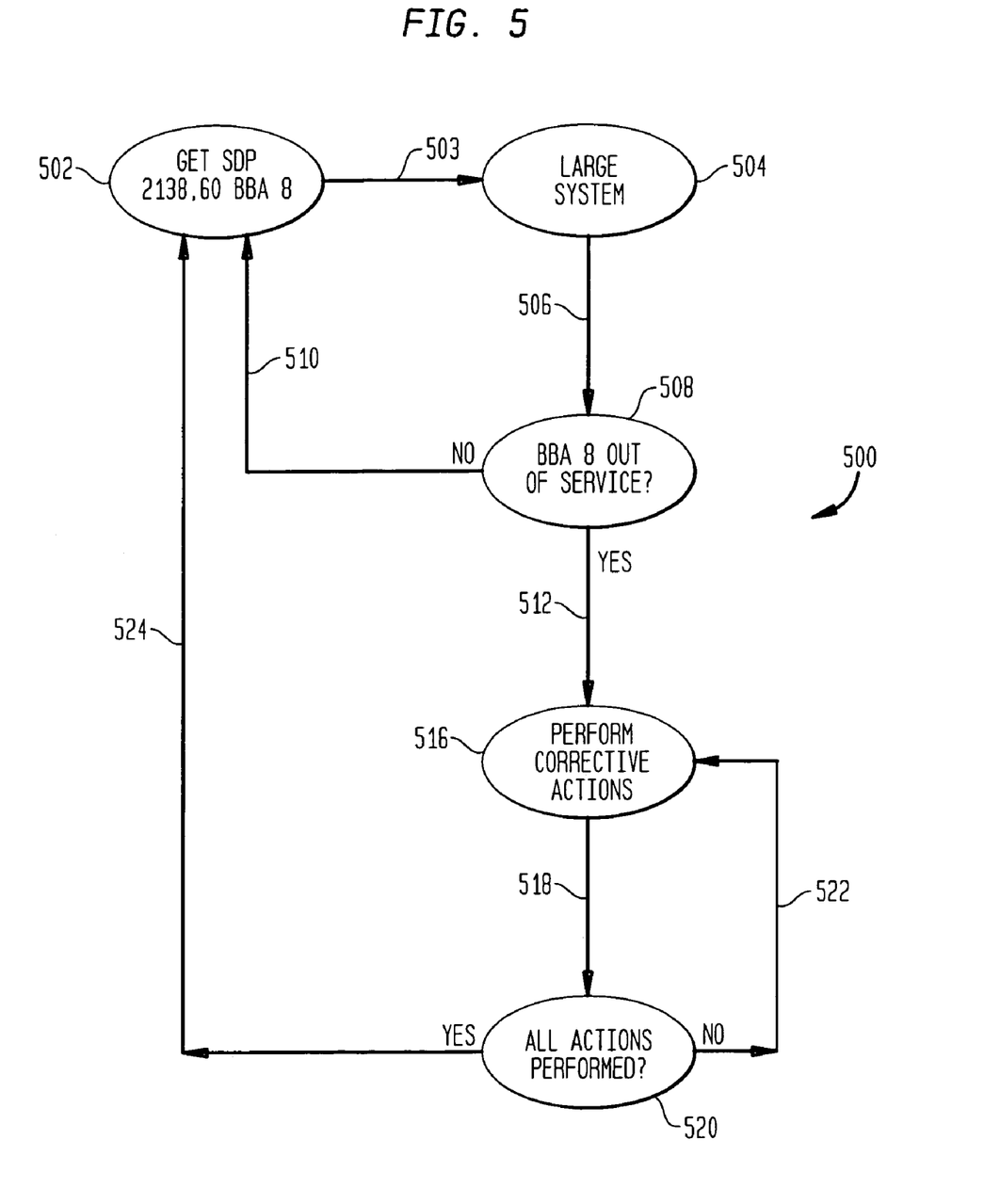

FIG. 5 is a state diagram 500 that extends the example represented by FIG. 4. In FIG. 5, the state 502, link 503, state 504 and link 506 correspond to the items 416, 418, 420 and 422 of FIG. 4. The remaining parts of FIG. 5 correspond to the item 424 (Make Decisions) of FIG. 4.

State 508 represents a determination of whether BBA 8 is out of service (OOS). If not, then flow proceeds to loop back to state 502 via link 510. If BBA 8 is out of service, then flow proceeds to state 516 via link 512. At state 516, corrective actions are performed, e.g., to bring BBA 8 back into service. Flow proceeds from state 516 via link 518 to state 520, where it is determined if all the corrective actions have been performed. If not, then flow proceeds to loop back to state 516 via link 522. If all corrective actions have been performed, then flow proceeds to loop back to state 502 via link 524.

The determination state 508 is conventionally embodied by a human, as in item 414 of FIG. 4. The invention makes it possible to automate state 508, or at the least confirm the human's recognition and interpretation of the indicators, i.e., the mix of alphanumerics and color combinations, on the VDD 312.

The example embodiments of the invention have translated the non-text data into text data after the aspect of extracting the groups of data (representative of the plurality of indicators) from the file of non-text display-generation data. This has the advantage of facilitating inspection of the subsequent aspects by a human because text data is more easily understood than non-text data. However, such translation from non-text data to text data could alternatively take place before the aspect of extracting or before the aspect of converting.

The invention has been described, for convenience, using the AUTOPLEX® MCRT monitoring system as a well-known example of a dedicated non-text-variable-output system. However, the invention is applicable in other dedicated non-text-variable-output systems such as those found in the air traffic control arts, train and subway control arts, chemical processing plant control arts, power generation plant control arts, etc. Again, common characteristics of these non-text-variable-output systems include (1) that they hold operator captive by, and vulnerable to, the need to visually inspect their respective video display device (VDD) outputs and (2) that they are mature products for which research and development efforts have been greatly diminished, making substantive software rewrites (to obtain more user-friendly output) prohibitively expensive. Thus, the invention does not disturb the existing monitoring system and yet achieves a desired goal of translating the attributes of an indicator in dedicated non-text-variable-output systems into text variables that represent the characteristics of the indicator without rewriting the software of the dedicated non-text-variable-output systems.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. In a system having a video screen energized according to non-text display-generation data obtained at least indirectly from a video card, a method for automatically translating a subset of said non-text display-generation data into text variables having values that represent characteristics of a desired one of a plurality of indicators, the method comprising:

acquiring said non-text display-generation data at least indirectly from a video card;

extracting groups of non-text data, representative of said plurality of indicators, respectively, from said non-text display-generation data;

translating said groups of non-text data into groups of text data;

identifying one of said groups of text data as corresponding to said desired indicator; and converting the identified group of text data into a set of text variables having values representative of said characteristics of said desired indicator.

2. The method of claim 1, wherein said video screen representing an interface that features a plurality of indicators and wherein the aspect of acquiring includes:

connecting to said interface;

submitting a request for predetermined arrangement of indicators on said video screen to said interface in response to which said non-text display-generation data will be produced; and obtaining a copy of said non-text display-generation data.

3. The method of claim 2, wherein the aspect of acquiring further includes:

assuring, before submitting said request, that a cursor on said video screen is in a predetermined location on an input screen.

4. The method of claim 3, wherein the aspect of assuring includes:

obtaining a copy of a non-text display-generation data corresponding to said input screen;

translating said non-text display-generation data corresponding to said input screen into a file of text data;

determining coordinates of said cursor in said file of text data corresponding to said input screen; and toggling, if said coordinates of said cursor do not match said predetermined location, said cursor to said predetermined location.

5. The method of claim 1, wherein the aspect of extracting includes:

parsing each string of data in said non-text display-generation data that is bounded at the beginning and at the end by predetermined data values to produce said groups on non-text data.

6. The method of claim 5, wherein said predetermined data values represent an escape character.

7. The method of claim 5, wherein the aspect of extracting further includes:

filtering data that do not represent characteristics of an indicator out of said groups of non-text data.

8. The method of claim 1, wherein said non-text display data is hexadecimal data and said text data is ASCII data, and said aspect of translating translates from said hexadecimal data into said ASCII data.

9. The method of claim 1, wherein the aspect of identifying includes:

retrieving a list of at least one trait that might be possessed by the identified group of text data corresponding to said desired indicator; and searching said groups of text data to find a match for one of the traits on said list.

10. The method of claim 9, wherein said trait is a coordinate combination on said video screen for said desired indicator.

11. The method of claim 9, wherein the aspect of retrieving indexes a look-up table (LUT).

12. The method according to claim 9, wherein, if no groups of data match a trait on said list, then said text variables are each set to text string descriptive of there being no such indicator displayed on said video screen.

13. The method of claim 1, wherein the aspect of converting includes:

recognizing ones of said text data representing an alphanumeric string to be displayed on said video screen; and setting one of said text variables to be said alphanumeric string.

14. The method of claim 1, wherein the aspect of converting includes:

recognizing ones of said text data representing a color to be displayed;

retrieving, as a function of the recognized ones of said text data, a color-descriptive alphanumeric string describing said color to be displayed; and setting one of said text variables to be said color-descriptive alphanumeric string.

15. The method of claim 14, wherein the aspect of retrieving said descriptive alphanumeric text string indexes a look-up table (LUT).

16. The method of claim 14, wherein the aspect of retrieving further includes:

retrieving a version-number indicating a version of said interface; and retrieving, as a function of said version-number and said color-descriptive text string, a state-descriptive alphanumeric string descriptive of a state represented by said color-descriptive string.

17. The method of claim 16, wherein the aspect of retrieving said alphanumeric state-descriptive string indexes a look-up table (LUT).

18. The method of claim 1, wherein the non-text display-generation data is obtained directly from the video card.

19. The method of claim 1, wherein a result of the steps of translating and converting is that a characteristic of at least one of the plurality of indicators is transformed from being described by one or more groups of the non-text display generation data into being described by one or more text variables having values representative thereof.

20. The method of claim 19, wherein the characteristic of the indicator includes at least one of the following: a color characteristic; a color-combination characteristic; a shape characteristic; a blinking characteristic; a visibility characteristic; a state characteristic; a foreground characteristic; a background characteristic; a location characteristic, relative to the video screen; and an alphanumeric characteristic.

21. In a system having a video screen energized according to non-text display-generation data obtained at least indirectly from a video card, a device for translating a subset of said non-text from said display-generation data into text variables having values that represent characteristics of a desired one of a plurality of indicators, the device comprising:

a programmed processor; and a first interface, between said processor and said user interface, to acquire said non-text display-generation data at least indirectly from a video card;

said programmed processor being operable to manipulate data subject data that includes at least one of said non-text display-generation data and other data corresponding thereto, by
  extracting groups of data, representative of said plurality of indicators, respectively, from said subject data;
  identifying one of said groups as corresponding to said desired indicator; and
  converting the identified group into a set of text variables having values representative of said characteristics of said desired indicator,
said programmed processor also being operable to translate non-text data into groups of text data either before the aspect of extracting, before the aspect of identifying or before the aspect of converting.

22. The device of claim 21, wherein the non-text display-generation data is obtained directly from the video card.

23. The device of claim 21, wherein a result of the steps of translating and converting is that a characteristic of at least one of the plurality of indicators is transformed from being described by one or more groups of the non-text display generation data into being described by one or more text variables having values representative thereof.

24. The device of claim 23, wherein the characteristic of the indicator includes at least one of the following: a color characteristic; a color-combination characteristic; a shape characteristic; a blinking characteristic; a visibility characteristic; a state characteristic; a foreground characteristic; a background characteristic; a location characteristic, relative to the video screen; and an alphanumeric characteristic.

25. For use with a system having a video screen energized according to non-text display-generation data obtained at least indirectly from a video card, a computer program embodied on a computer-readable medium for automatically translating a subset of said non-text from said display-generation data into text variables having values that represent characteristics of a desired one of a plurality of indicators, the computer program embodied on a computer-readable medium comprising:
  an acquisition segment for acquiring said non-text display-generation data at least indirectly from a video card; and
  a manipulation segment for manipulating subject data that includes at least one of said non-text display generation data and other data corresponding thereto, by
    an extraction segment for extracting groups of data, representative of said plurality of indicators, respectively, from said subject data;
    an identification segment for identifying one of said groups data as corresponding to said desired indicator; and
    a conversion segment for converting the identified group of data into a set of text variables having values representative of said characteristics of said desired indicator;
  said manipulation segment further including a translation segment for translating non-text data into text data either before interaction by said extraction segment, before interaction by said identification segment or before interaction by said conversion segment.

26. The computer program embodied on a computer-readable medium of claim 25, wherein the non-text display-generation data is obtained directly from the video card.

27. The computer program embodied on a computer-readable medium of claim 25, wherein a result of the steps of translating and converting is that a characteristic of at least one of the plurality of indicators is transformed from being described by one or more groups of the non-text display generation data into being described by one or more text variables having values representative thereof.

28. The computer program embodied on a computer-readable medium of claim 27, wherein the characteristic of the indicator includes at least one of the following: a color characteristic; a color-combination characteristic; a shape characteristic; a blinking characteristic; a visibility characteristic; a state characteristic; a foreground characteristic; a background characteristic; a location characteristic, relative to the video screen; and an alphanumeric characteristic.

29. In a system having a video screen energized according to a non-text display-generation data obtained at least indirectly from a video card, a method for automatically translating a subset of said non-text display-generation data into text variables having values that represent characteristics of a desired one of a plurality of indicators, the method comprising:
  acquiring non-text display-generation data at least indirectly from a video card;
  manipulating subject data that includes at least one of said non-text display generation data and other data corresponding thereto, by
    extracting groups of data, representative of said plurality of indicators, respectively, from said subject data;
    identifying one of said groups of data as corresponding to said desired indicator; and
    converting the identified group into a set of text variables having values representative of said characteristics of said desired indicator;
  said aspect of manipulating further including translating non-text data into text data either before the aspect of extracting, before the aspect of identifying or before the aspect of converting.

30. The method of claim 29, wherein the aspect of acquiring further includes:
  assuring, before submitting said request, that a cursor on said video screen is in a predetermined location on an input screen.

31. The method of claim 30, wherein the aspect of assuring includes:
  obtaining a copy of of non-text display-generation data corresponding to said input screen;
  treating the copy as a file;
  determining coordinates of said cursor in said file corresponding to said input screen; and
  toggling, if said coordinates of said cursor do not match said predetermined location, said cursor to said predetermined location.

32. The method of claim 30, wherein said aspect of assuring includes translating from non-text data into text data either before the aspect of determining or before the aspect of toggling.

33. The method of claim 29, wherein the aspect of acquiring includes:
  connecting to said interface;
  submitting a request for predetermined arrangement of indicators on said video screen to said interface in response to which said non-text display-generation data will be produced; and
  obtaining a copy of said non-text display-generation data.

34. The method of claim 29, wherein the aspect of extracting includes:
  parsing said subject data to produce said groups of non-text data, said data strings being at least one of preceded and followed by predetermined data values.

35. The method of claim 34, wherein said predetermined data values represent an escape character.

36. The method of claim 34, wherein the aspect of extracting further includes:
 filtering data that do not represent characteristics of an indicator out of said groups of data.

37. The method of claim 29, wherein said non-text data is hexadecimal data and said text data is ASCII data, and the aspect of translating translates from said hexadecimal data into said ASCII data.

38. The method of claim 29, wherein the aspect of identifying includes:
 retrieving a list of at least one trait that might be possessed by the identified group of data corresponding to said desired indicator; and
 searching said groups of data to find a match for one of the traits on said list.

39. The method of claim 38, wherein said trait is a coordinate combination on said video screen for said desired indicator.

40. The method of claim 38, wherein the aspect of retrieving indexes a look-up table (LUT).

41. The method according to claim 38, wherein, if no groups of data match a trait on said list, then said text variables are each set to text string descriptive of there being no such indicator displayed on said video screen.

42. The method of claim 29, wherein the aspect of converting includes:
 recognizing ones of said data representing an alphanumeric string to be displayed on said video screen; and
 setting one of said text variables to be said alphanumeric string.

43. The method of claim 29, wherein the aspect of converting includes:
 recognizing ones of said data representing a color to be displayed;
 retrieving, as a function of the recognized ones of said data, a color-descriptive alphanumeric string describing said color to be displayed; and
 setting one of said text variables to be said color-descriptive alphanumeric string.

44. The method of claim 43, wherein the aspect of retrieving said descriptive alphanumeric string indexes a look-up table (LUT).

45. The method of claim 43, wherein the aspect of retrieving further includes:
 retrieving a version-number indicating a version of said interface; and
 retrieving, as a function of said version-number and said color-descriptive string, a state-descriptive alphanumeric string descriptive of a state represented by said color-descriptive string.

46. The method of claim 45, wherein the aspect of retrieving said alphanumeric state-descriptive string indexes a look-up table (LUT).

47. The method of claim 29, wherein the non-text display-generation data is obtained directly from the video card.

48. The method of claim 29, wherein a result of the steps of translating and converting is that a characteristic of at least one of the plurality of indicators is transformed from being described by one or more groups of the non-text display generation data into being described by one or more text variables having values representative thereof.

49. The method of claim 48, wherein the characteristic of the indicator includes at least one of the following: a color characteristic; a color-combination characteristic; a shape characteristic; a blinking characteristic; a visibility characteristic; a state characteristic; a foreground characteristic; a background characteristic; a location characteristic, relative to the video screen; and an alphanumeric characteristic.

* * * * *